US011592085B2

United States Patent
Islemecioglu et al.

(10) Patent No.: US 11,592,085 B2
(45) Date of Patent: Feb. 28, 2023

(54) BELT-TENSIONING DEVICE

(71) Applicant: Bayerische Motoren Werke Aktiengesellschaft, Munich (DE)

(72) Inventors: Yavuz Islemecioglu, Munich (DE); Matthias Sagner, Munich (DE); Frank Sliwa, Garching (DE); Emmerich Weissenbek, Landshut (DE); Johannes Wunder, Hohenbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 140 days.

(21) Appl. No.: 16/831,645

(22) Filed: Mar. 26, 2020

(65) Prior Publication Data
US 2020/0224751 A1 Jul. 16, 2020

Related U.S. Application Data

(63) Continuation of application No. PCT/EP2018/073957, filed on Sep. 6, 2018.

(30) Foreign Application Priority Data

Oct. 5, 2017 (DE) ..................... 10 2017 217 645.8

(51) Int. Cl.
*F16H 7/12* (2006.01)
*F16H 7/08* (2006.01)

(52) U.S. Cl.
CPC ............. *F16H 7/1281* (2013.01); *F16H 7/08* (2013.01); *F16H 2007/0804* (2013.01);
(Continued)

(58) Field of Classification Search
CPC .............. F16H 7/08; F16H 2007/0863; F16H 2007/0865; F16H 2007/0874;
(Continued)

(56) References Cited

U.S. PATENT DOCUMENTS 1,848,423 A * 3/1932 Jackson ................. D01H 1/241
474/134
2,954,726 A * 10/1960 Kerridge ............... F16H 7/1281
404/117
(Continued)

FOREIGN PATENT DOCUMENTS

CN 101688593 A 3/2010
CN 105308360 A 2/2016
(Continued)

OTHER PUBLICATIONS

PCT/EP2018/073957, International Search Report dated Oct. 29, 2018 (Two (2) pages).
(Continued)

*Primary Examiner* — Michael R Mansen
*Assistant Examiner* — Raveen J Dias
(74) *Attorney, Agent, or Firm* — Crowell & Moring LLP

(57) ABSTRACT

A belt-tensioning device includes an electric machine having a drive belt pulley, which is driven about a drive axis, and a further drive belt pulley, where an endless belt wraps around the drive belt pulleys. The device has a housing in which a first and a second spring arm are mounted, in each of which spring arms a tension roller having axes of rotation which are parallel to the drive axis is rotatably mounted. The spring arms are supported against one another and press the endless belt together via the tension rollers in the region of the drive belt pulley. A first and a second further spring arm are provided adjacent to the spring arms which are adjustable by an adjustment element such that the spring forces of the further spring arms either do or do not support the spring forces of the spring arms acting on the endless belt.

13 Claims, 2 Drawing Sheets

(52) U.S. Cl.
CPC ........... *F16H 2007/0812* (2013.01); *F16H 2007/0823* (2013.01); *F16H 2007/0865* (2013.01); *F16H 2007/0874* (2013.01); *F16H 2007/0893* (2013.01)

(58) Field of Classification Search
CPC ....... F16H 2007/0876; F16H 2007/088; F16H 2007/0893; F16H 7/10; F16H 7/12; F16H 7/1281; F16H 2007/081; F16H 2007/0804; F16H 2007/0842; F16H 2007/0844; F16H 2007/0878; F16H 2007/0823
USPC .......................................... 474/133, 134, 135
See application file for complete search history.

(56) References Cited

U.S. PATENT DOCUMENTS

| | | | | |
|---|---|---|---|---|
| 4,069,719 | A * | 1/1978 | Cancilla | B62M 9/16 474/134 |
| 4,416,647 | A * | 11/1983 | White, Jr. | F16H 7/1281 474/134 |
| 4,934,989 | A * | 6/1990 | Furukawa | F16H 7/1281 474/135 |
| 6,406,393 | B1 * | 6/2002 | Chen | F16H 7/1281 474/101 |
| 6,830,524 | B2 * | 12/2004 | Tamai | F16H 7/1281 474/111 |
| 7,892,125 | B2 * | 2/2011 | Nelson | F16H 7/1254 474/134 |
| 8,821,328 | B2 * | 9/2014 | Jud | F16H 7/1281 474/134 |
| 9,341,243 | B2 * | 5/2016 | Replete | F16H 7/1218 |
| 9,528,576 | B2 * | 12/2016 | Anstey | F16H 7/00 |
| 9,739,347 | B2 * | 8/2017 | Petridis | F02N 19/00 |
| 9,890,837 | B1 * | 2/2018 | Martinez | F16H 7/1218 |
| 10,566,874 | B2 * | 2/2020 | Ben-Omrane | H02K 7/1008 |
| 10,690,224 | B2 * | 6/2020 | Hansen | F16H 7/12 |
| 10,900,546 | B2 * | 1/2021 | Lee | F16H 7/023 |
| 11,105,402 | B2 * | 8/2021 | Woo | H02K 7/1815 |
| 11,174,921 | B2 * | 11/2021 | Fischer | F16H 9/26 |
| 2003/0216203 | A1 * | 11/2003 | Oliver | F16H 7/1281 474/134 |
| 2004/0043854 | A1 * | 3/2004 | Fraley, Jr. | F16H 7/1281 474/134 |
| 2004/0072642 | A1 * | 4/2004 | Serkh | F16H 7/1218 474/134 |
| 2004/0102271 | A1 * | 5/2004 | Serkh | F16H 7/1218 474/101 |
| 2007/0066428 | A1 * | 3/2007 | Tryphonos | F01L 1/024 474/111 |
| 2009/0069134 | A1 * | 3/2009 | Kuo | F16H 7/1281 474/134 |
| 2009/0186726 | A1 * | 7/2009 | Van Maanen | F16H 7/1281 474/110 |
| 2011/0070986 | A1 * | 3/2011 | Maguire | F02B 67/06 474/135 |
| 2012/0202629 | A1 * | 8/2012 | O'Shea | F16H 7/0836 474/110 |
| 2012/0225744 | A1 * | 9/2012 | Markley | F16H 7/08 474/111 |
| 2013/0059686 | A1 * | 3/2013 | Markley | F16H 7/08 474/111 |
| 2013/0059687 | A1 * | 3/2013 | Markley | F16H 7/0831 474/111 |
| 2014/0194236 | A1 * | 7/2014 | Orita | F16H 7/1281 474/112 |
| 2014/0235388 | A1 | 8/2014 | Chang | |
| 2015/0308545 | A1 * | 10/2015 | Harvey | F02B 67/06 474/117 |
| 2015/0345597 | A1 * | 12/2015 | Walter | F16H 7/1218 474/134 |
| 2016/0146312 | A1 * | 5/2016 | Pfeifer | F16H 7/08 474/135 |
| 2016/0273622 | A1 * | 9/2016 | Kim | F02N 11/00 |
| 2017/0074375 | A1 * | 3/2017 | Ryeland | F16H 7/1281 |
| 2017/0146100 | A1 * | 5/2017 | Walter | F02B 67/06 |
| 2017/0306836 | A1 * | 10/2017 | Replete | F02B 67/06 |
| 2018/0010670 | A1 * | 1/2018 | Leucht | F16H 7/0831 |
| 2018/0017143 | A1 * | 1/2018 | Antchak | B60K 6/48 |
| 2018/0355955 | A1 * | 12/2018 | Lee | F16H 7/1209 |
| 2019/0017579 | A1 * | 1/2019 | Stadermann | F16H 7/1218 |
| 2019/0078667 | A1 * | 3/2019 | Liu | F16H 7/18 |
| 2019/0120345 | A1 * | 4/2019 | Pfeifer | F16H 7/1218 |
| 2019/0145501 | A1 * | 5/2019 | Singh | F16H 7/1281 474/134 |
| 2019/0242462 | A1 * | 8/2019 | Willis | F16H 7/12 |
| 2019/0285147 | A1 * | 9/2019 | Singh | F16H 7/1218 |
| 2019/0285148 | A1 * | 9/2019 | Ma | F16H 7/12 |
| 2019/0285149 | A1 * | 9/2019 | Ogawa | F16H 7/1281 |
| 2019/0301420 | A1 * | 10/2019 | Allard | F16H 7/08 |
| 2020/0072323 | A1 * | 3/2020 | Montani | F16H 7/08 |
| 2020/0132173 | A1 * | 4/2020 | Mora | F16H 7/1218 |
| 2020/0370627 | A1 * | 11/2020 | Caprotti | F16H 7/0831 |
| 2021/0018074 | A1 * | 1/2021 | Pfeifer | F16H 7/12 |
| 2021/0041010 | A1 * | 2/2021 | Koppeser | F16H 7/10 |
| 2021/0123375 | A1 * | 4/2021 | Montani | F02B 67/06 |
| 2021/0140519 | A1 * | 5/2021 | Caprotti | F16H 7/1281 |
| 2022/0018421 | A1 * | 1/2022 | Stadermann | F16H 7/1209 |

FOREIGN PATENT DOCUMENTS

| | | | | |
|---|---|---|---|---|
| CN | 105626798 A | | 6/2016 | |
| DE | 10 2007 051 228 A | | 12/2008 | |
| DE | 10 2014 220 926 A1 | | 4/2016 | |
| DE | 10 2014 117 094 A1 | | 5/2016 | |
| DE | 10 2015 211 227 A1 | | 12/2016 | |
| DE | 10 2015 119 935 A1 | | 5/2017 | |
| DE | 102017107047 A1 * | | 10/2018 | ............. F16H 7/10 |
| DE | 102018104497 A1 * | | 8/2019 | ............. F16H 7/08 |
| DE | 102018104499 A1 * | | 8/2019 | ............. F16H 7/12 |
| DE | 102019114099 A1 * | | 12/2020 | ............. F16H 7/12 |
| DE | 102020106309 A1 * | | 9/2021 | ............. F02B 67/06 |
| EP | 2 128 489 A2 | | 12/2009 | |
| EP | 2778472 A1 * | | 9/2014 | ............. F16F 1/04 |
| EP | 3 023 670 A1 | | 5/2016 | |
| GB | 2545213 A * | | 6/2017 | ............. F02B 67/06 |
| GB | 2568048 A * | | 5/2019 | ............. F16H 7/08 |
| JP | 10-186759 A | | 7/1998 | |
| JP | 2015064034 A * | | 4/2015 | |
| WO | WO-2011067068 A1 * | | 6/2011 | ........... F16H 7/1227 |
| WO | WO 2015/167602 A1 | | 11/2015 | |
| WO | WO-2016098051 A * | | 6/2016 | ............. F16H 7/12 |
| WO | WO-2017147251 A1 * | | 8/2017 | ............. F16H 7/08 |
| WO | WO-2019090423 A9 * | | 6/2019 | ............. F02B 67/06 |
| WO | WO-2021187482 A1 * | | 9/2021 | ............. F02B 67/06 |

OTHER PUBLICATIONS

German Search Report issued in German counterpart application No. 10 2017 217 645.8 dated Apr. 5, 2018, with Statement of Relevancy (Seven (7) pages).

Chinese Office Action issued in Chinese application No. 201880041275.6 dated May 27, 2022, with English translation (Sixteen (16) pages).

* cited by examiner

BELT-TENSIONING DEVICE

CROSS REFERENCE TO RELATED APPLICATIONS

This application is a continuation of PCT International Application No. PCT/EP2018/073957, filed Sep. 6, 2018, which claims priority under 35 U.S.C. § 119 from German Patent Application No. 10 2017 217 645.8, filed Oct. 5, 2017, the entire disclosures of which are herein expressly incorporated by reference.

BACKGROUND AND SUMMARY OF THE INVENTION

The invention relates to a belt-tensioning device for a belt drive of an internal combustion engine.

With regard to the technical field, reference is made for example to the European patent application EP 3 023 670 A1. In this laid-open specification, a description is given of a belt-tensioning device comprising: a main body, which has a fastening section and an opening for a drive shaft, first and second tensioning arms, which are mounted by means of first and second bearings on the main body so as to be pivotable about first and second pivot axes and have first and second tensioning rollers, a spring arrangement, which pre-tensions the two tensioning arms against one another in a circumferential direction, wherein the spring arrangement has at least one yoke spring which has a circumferential extent of less than 360° about the first and second pivot axes, wherein the at least one yoke spring has first and second support sections, which are supported on the first and second tensioning arms, and a spring section, which extends between the first and second support sections, wherein, in the region of the first and second support sections, the at least one yoke spring has an axial length which is shorter than the total axial length of the yoke spring.

The European patent application EP 2 128 489 A2, on which the present invention is based, has furthermore disclosed a belt-tensioning device for starter-generator applications. It involves a belt-tensioning device for a belt drive, which has a drive machine with a drive belt pulley, which is able to be driven about a drive axis by a drive shaft, and has multiple further belt pulleys, and having an endless belt which is looped around the drive belt pulley and the further belt pulleys, wherein the belt-tensioning device has a housing in which two tensioning arms are mounted so as to be pivotable about a common pivot axis, a tensioning roller with an axis of rotation parallel to the drive axis being mounted in each of the tensioning arms. Furthermore, the tensioning arms are supported against one another by way of spring means, wherein, when the drive belt pulley is fitted on the drive machine, the housing is able to be fitted in that the housing is in an annular region surrounding the drive shaft of the drive belt pulley such that the housing is contact-free with respect to the drive machine.

The above-described starter-generator concepts in the belt drive require an increase in the belt force for all the operating states of the internal combustion engine, for the purpose of ensuring that slip of the drive belt is minimized. This disadvantageously leads to an increase in fuel consumption of the internal combustion engine.

It is an object of the present invention to provide a belt-tensioning device which does not have the aforementioned disadvantage.

For the configuration according to the invention of the belt-tensioning device for a belt drive of an internal combustion engine, having an electric machine which functions as a starter-generator, an increase in spring force can be realized for example when the internal combustion engine is started or during full-load operation, whereby, during normal operation of the internal combustion engine, a lower contact pressure prevails, with the result that fuel is saved.

Preferably, the setting element is an electromechanical or hydraulic setting element since, by way of both, large forces are able to be applied with at the same time very quick switching times.

The invention is discussed in more detail below on the basis of four Figures.

Other objects, advantages and novel features of the present invention will become apparent from the following detailed description of one or more preferred embodiments when considered in conjunction with the accompanying drawings.

DETAILED DESCRIPTION OF THE DRAWINGS

Below, identical components in FIGS. 1 to 4 are denoted by the same reference numbers.

Figure 1:
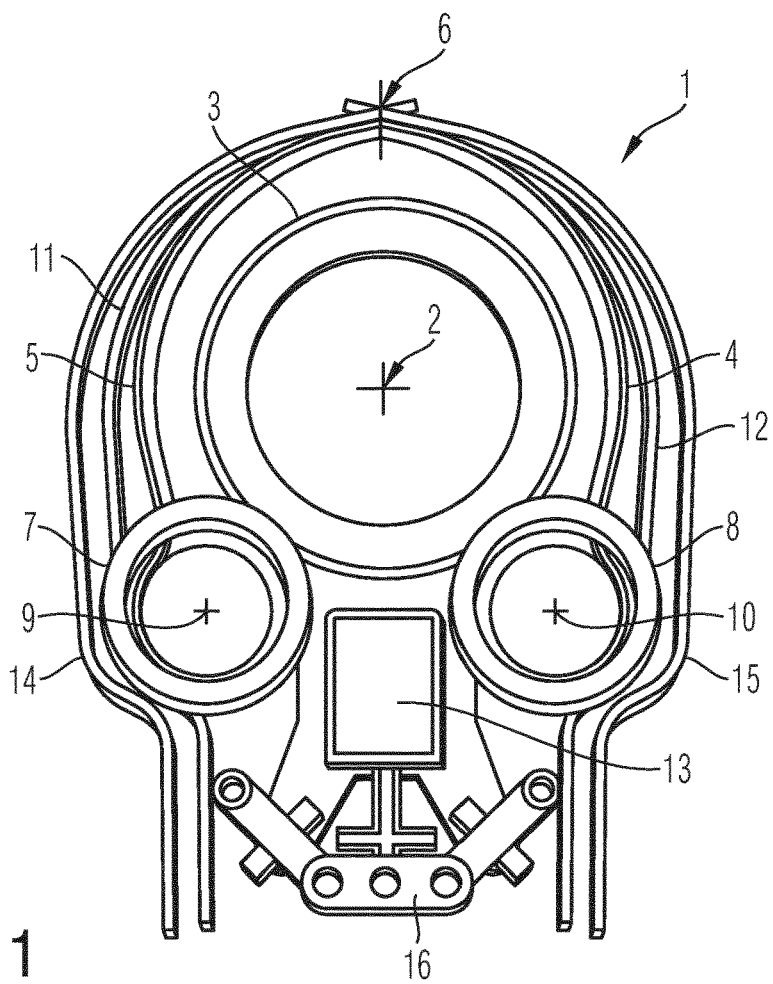
FIG. 1 shows a plan view of a belt-tensioning device reduced to the essentials.

FIG. 1 shows a plan view of a belt-tensioning device 1 reduced to the essentials. The belt-tensioning device 1 is provided for a belt drive of an internal combustion engine, which has an electric machine used in particular as a starter-generator. The electric machine (not illustrated) has a drive belt pulley which, on the one hand, is able to be driven about a drive axis 2 by a drive shaft, and on the other hand, is able to drive the electric machine as a generator. Furthermore, at least one further drive belt pulley (not illustrated) is provided in the belt drive, wherein an endless belt (likewise not illustrated) is looped around the drive belt pulley and the further drive belt pulley.

The belt-tensioning device 1 has a housing 3 which, in the present exemplary embodiment, is likewise reduced to the essentials, a bearing structure. A first and a second spring arm 4, 5 are mounted on the housing 3 so as to be pivotable about a common pivot axis 6. In each case one tensioning roller 7, 8 with an axis of rotation 9, 10 which is parallel to the drive axis 2 is mounted rotatably on the first spring arm 4 and the second spring arm 5. Furthermore, the spring arms 4, 5 are supported against one another at a pivot axis 6, wherein the spring arms 4, 5 press the endless belt together via the tensioning rollers 7, 8 in the region of the drive belt pulley owing to the prevailing spring force of the spring arms 4, 5.

According to the invention, provision is made at the spring arms 4, 5, in each case in an adjacent manner, of a first and a second further spring arm 11, 12, which are able to be adjusted by a setting element 13 such that their spring forces assist, or do not assist, the spring forces of the spring arms 4, 5 on the endless belt. In a first position of the first further spring arm and the second further spring arm shown in FIG. 1, the first spring arm 4 and the second spring arm 5 are assisted by the spring forces. In a second position 14 for the first further spring arm and a second position 15 for the second further spring arm also shown in FIG. 1, no force assistance takes place, meaning that a lower pressure acts on the endless traction mechanism, with the result that the drive power of the internal combustion engine is reduced and fuel is thus saved.

Application of the spring forces of the first further spring arm 11 and the second further spring arm 12 is preferably realized in a start phase and/or in a high rotational speed or load range of the internal combustion engine.

In a first exemplary embodiment, the spring arms 4, 5 and the further spring arms 11, 12 may be arranged so as to be coaxial with one another. This advantageously does not lead to any structural extension of the belt-tensioning device 1 in terms of depth.

In a second embodiment variant, the spring arms 4, 5 and the further spring arms 11, 12 may also be arranged so as to be axially spaced apart from one another, this constituting a slight structural extension in terms of depth.

In one exemplary embodiment, the setting element 13 may be an electromechanical or hydraulic setting element. Both systems have extremely quick switching times and are easy to activate.

In a further exemplary embodiment of the belt-tensioning device 1 according to the invention, the spring arms 4, 5 and the further spring arms 11, 12 may have a substantially rectangular or square cross section. This embodiment variant again yields structural advantages since the spring arms and the further spring arms 11, 12 form a tighter package.

In yet another exemplary embodiment, the spring arms 4, 5 and the further spring arms 11, 12 may have a substantially round or oval cross section.

It goes without saying that it is also possible to combine rectangular or square cross sections with round or oval cross sections.

Figure 2:
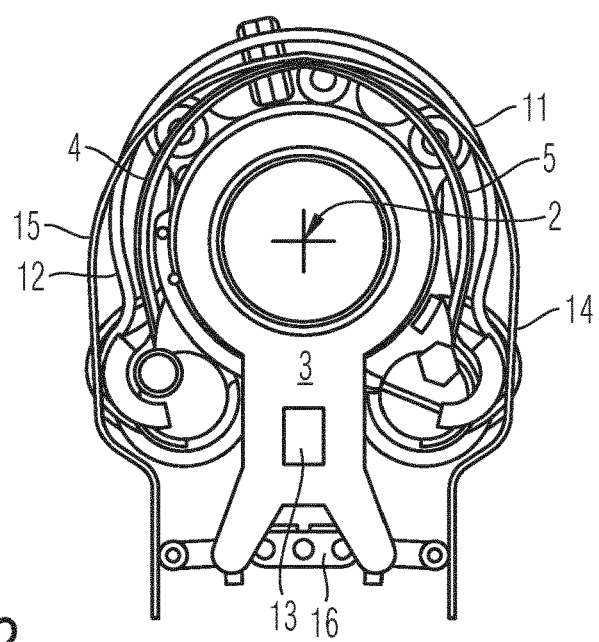
FIG. 2 shows a rear view of the belt-tensioning device.

FIG. 2 shows a rear view of the belt-tensioning device 1 according to the invention.

Figure 3:
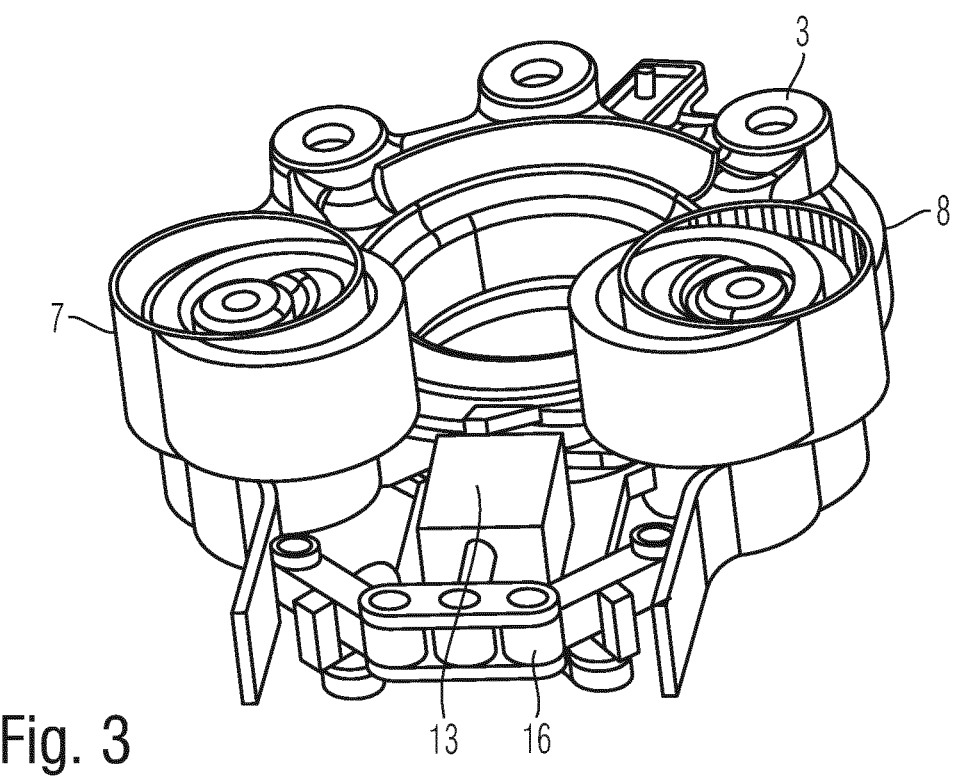
FIG. 3 shows a three-dimensional view of the belt-tensioning device according to the invention.

FIG. 3 shows a three-dimensional view of the belt-tensioning device 1 according to the invention. As can be clearly seen in FIGS. 1 and 3, the setting element 13 can act for example via a knee lever 16 on the first further spring arm 11 and the second further spring arm 12.

Figure 4:
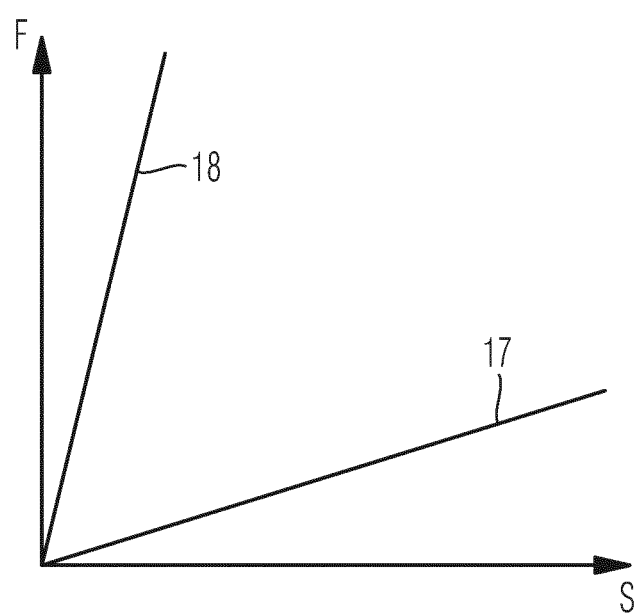
FIG. 4 shows in a diagram the effect according to the invention.

FIG. 4 shows in a diagram the effect of the configuration according to the invention of the belt-tensioning device 1. A force F is plotted without a unit over a Y-axis, and an adjustment travel S is plotted over an X-axis. A so-called force-travel diagram is involved here. A first graph, which is denoted by 17, shows a force-travel characteristic curve for an individual spring arm 4, 5.

A second graph, which is denoted by 18, shows a force-travel characteristic curve for a spring arm 4, 5 for which a further spring arm 11, 12 is applied. Consequently, the graph 18 can be used for example only during the starting process, or at high loads and rotational speeds of the internal combustion engine, so as to avoid the necessary slip. In the remaining operating ranges of the internal combustion engine, use is made of the characteristic curve 17 for the purpose of saving fuel.

LIST OF REFERENCE CHARACTERS

1 Belt-tensioning device
2 Drive axis
3 Housing
4 First spring arm
5 Second spring arm
6 Pivot axis
7 Tensioning roller
8 Tensioning roller
9 Axis of rotation
10 Axis of rotation
11 First further spring arm
12 Second further spring arm
13 Setting element
14 First further spring arm in non-applied state
15 Second further spring arm in non-applied state
16 Knee lever
17 Force-travel characteristic curve for spring arm
18 Force-travel characteristic curve for spring arm and further spring arm The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A belt-tensioning device for a belt drive of an internal combustion engine, comprising:
    an electric machine with a first drive belt pulley which is drivable about a drive axis by a drive shaft;
    a second drive belt pulley;
    an endless belt that is looped around the first drive belt pulley and the second drive belt pulley;
    a housing;
    a first spring arm and a second spring arm disposed in the housing and which are pivotably mounted about a common pivot axis;
    a first tensioning roller and a second tensioning roller with a respective axis of rotation which is parallel to the drive axis and which are respectively rotatably mounted in the first spring arm and the second spring arm;
    wherein the first spring arm and the second spring arm are supported against one another and wherein the first spring arm and the second spring arm press the endless belt together via the first tensioning roller and the second tensioning roller in a region of the first drive belt pulley;
    a third spring arm and a fourth spring arm respectively disposed adjacent to the first spring arm and the second spring arm; and
    a setting element, wherein the third spring arm and the fourth spring arm are adjustable by the setting element such that a respective spring force of the third spring arm and the fourth spring arm assists, or does not assist, a respective spring force of the first spring arm and the second spring arm on the endless belt;
    wherein the setting element is an electromechanical or hydraulic setting element.

2. The belt-tensioning device according to claim 1, wherein the first and second spring arms are disposed coaxial with the third and fourth spring arms.

3. The belt-tensioning device according to claim 1, wherein the first and second spring arms are disposed axially spaced apart from the third and fourth spring arms.

4. The belt-tensioning device according to claim 1, wherein the first spring arm and the second spring arm and the third spring arm and the fourth spring arm have a substantially rectangular or square cross section.

5. The belt-tensioning device according to claim 1, wherein the first spring arm and the second spring arm and the third spring arm and the fourth spring arm have a substantially round or oval cross section.

6. A belt-tensioning device for a belt drive of an internal combustion engine, comprising:
- an electric machine with a first drive belt pulley which is drivable about a drive axis by a drive shaft;
- a second drive belt pulley;
- an endless belt that is looped around the first drive belt pulley and the second drive belt pulley;
- a housing;
- a first spring arm and a second spring arm disposed in the housing and which are pivotably mounted about a common pivot axis;
- a first tensioning roller and a second tensioning roller with a respective axis of rotation which is parallel to the drive axis and which are respectively rotatably mounted in the first spring arm and the second spring arm;
- wherein the first spring arm and the second spring arm are supported against one another and wherein the first spring arm and the second spring arm press the endless belt together via the first tensioning roller and the second tensioning roller in a region of the first drive belt pulley;
- a third spring arm and a fourth spring arm respectively disposed adjacent to the first spring arm and the second spring arm; and
- a setting element, wherein the third spring arm and the fourth spring arm are adjustable by the setting element such that a respective spring force of the third spring arm and the fourth spring arm assists, or does not assist, a respective spring force of the first spring arm and the second spring arm on the endless belt;
- wherein the first spring arm and the second spring arm and the third spring arm and the fourth spring arm have a substantially rectangular or square cross section.

7. The belt-tensioning device according to claim 6, wherein the first and second spring arms are disposed coaxial with the third and fourth spring arms.

8. The belt-tensioning device according to claim 6, wherein the first and second spring arms are disposed axially spaced apart from the third and fourth spring arms.

9. The belt-tensioning device according to claim 6, wherein the setting element is an electromechanical or hydraulic setting element.

10. A belt-tensioning device for a belt drive of an internal combustion engine, comprising:
- an electric machine with a first drive belt pulley which is drivable about a drive axis by a drive shaft;
- a second drive belt pulley;
- an endless belt that is looped around the first drive belt pulley and the second drive belt pulley;
- a housing;
- a first spring arm and a second spring arm disposed in the housing and which are pivotably mounted about a common pivot axis;
- a first tensioning roller and a second tensioning roller with a respective axis of rotation which is parallel to the drive axis and which are respectively rotatably mounted in the first spring arm and the second spring arm;
- wherein the first spring arm and the second spring arm are supported against one another and wherein the first spring arm and the second spring arm press the endless belt together via the first tensioning roller and the second tensioning roller in a region of the first drive belt pulley;
- a third spring arm and a fourth spring arm respectively disposed adjacent to the first spring arm and the second spring arm; and
- a setting element, wherein the third spring arm and the fourth spring arm are adjustable by the setting element such that a respective spring force of the third spring arm and the fourth spring arm assists, or does not assist, a respective spring force of the first spring arm and the second spring arm on the endless belt;
- wherein the first spring arm and the second spring arm and the third spring arm and the fourth spring arm have a substantially round or oval cross section.

11. The belt-tensioning device according to claim 10, wherein the first and second spring arms are disposed coaxial with the third and fourth spring arms.

12. The belt-tensioning device according to claim 10, wherein the first and second spring arms are disposed axially spaced apart from the third and fourth spring arms.

13. The belt-tensioning device according to claim 10, wherein the setting element is an electromechanical or hydraulic setting element.

* * * * *